United States Patent
Malone et al.

(10) Patent No.: US 6,922,655 B2
(45) Date of Patent: Jul. 26, 2005

(54) METHOD AND APPARATUS FOR COUPLING A CONDUIT

(75) Inventors: Dennis Malone, Indian Springs, OH (US); Jerry Gordon Glatt, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 10/323,053

(22) Filed: Dec. 18, 2002

(65) Prior Publication Data

US 2004/0122619 A1 Jun. 24, 2004

(51) Int. Cl.$^7$ .......................... G06F 11/30; G21C 17/00
(52) U.S. Cl. ................................................ 702/182
(58) Field of Search ....................... 702/33, 41–43, 702/81, 82, 105, 179–182, 189, 199; 285/31, 32, 39; 73/45.4, 49.1, 49.2, 49.3, 49.5

(56) References Cited

U.S. PATENT DOCUMENTS

| | | |
|---|---|---|
| 3,867,616 A | 2/1975 | Korelitz et al. |
| 4,779,465 A * | 10/1988 | Stearns et al. ......... 73/882.541 |
| 4,854,525 A | 8/1989 | Chee |
| 4,885,704 A | 12/1989 | Takagi et al. |
| 4,928,233 A | 5/1990 | Millis |
| 5,064,144 A | 11/1991 | Chee |
| 5,193,628 A * | 3/1993 | Hill et al. ................ 175/45 |
| 5,222,360 A | 6/1993 | Antuna et al. |
| 5,260,883 A | 11/1993 | Wilson |
| 5,293,479 A | 3/1994 | Quintero et al. |
| 5,321,816 A | 6/1994 | Rogan et al. |
| 5,381,773 A | 1/1995 | Straub |
| 5,396,761 A | 3/1995 | Woltmann et al. |
| 5,467,758 A | 11/1995 | Moriyama et al. |
| 5,504,687 A | 4/1996 | Wolf |
| 5,517,428 A | 5/1996 | Williams |
| 5,524,198 A | 6/1996 | Matsumoto et al. |
| 5,555,406 A | 9/1996 | Nozawa |
| 5,590,255 A | 12/1996 | Takeshima et al. |
| 5,680,525 A | 10/1997 | Sakai et al. |
| 5,862,322 A | 1/1999 | Anglin et al. |
| 6,002,854 A | 12/1999 | Lynch et al. |
| 6,009,406 A | 12/1999 | Nick |
| 6,232,703 B1 | 5/2001 | Huffman |
| 6,240,421 B1 | 5/2001 | Stolarz |
| 6,243,611 B1 | 6/2001 | Hazama et al. |
| 6,268,853 B1 | 7/2001 | Hoskins et al. |
| 6,268,871 B1 | 7/2001 | Rice et al. |
| 6,470,733 B1 * | 10/2002 | Barr .......................... 73/45.4 |

* cited by examiner

Primary Examiner—Michael Nghiem
(74) Attorney, Agent, or Firm—Armstrong Teasdale LLP; William Scott Andes (57) ABSTRACT

A method for predictive analysis of the performance and reliability of an assembly includes measuring at least one force associated with construction of the assembly, and comparing the measured force to a predetermined expected force range, wherein the predetermined expected force range is determined by measuring at least one force associated with the construction of a plurality of similar assemblies, and determining an average force profile for the plurality of assemblies based on the plurality of measurements taken.

17 Claims, 8 Drawing Sheets

METHOD AND APPARATUS FOR COUPLING A CONDUIT

BACKGROUND OF THE INVENTION

This invention relates generally to fittings, and more specifically to methods and apparatus for coupling a conduit to a fitting.

At least some known conduit fitting assemblies include a collar coupled to an end fitting. The end of the conduit end is received within a portion of the collar, and a portion of the end fitting is received within the conduit end. More specifically, the portion of the collar that includes the conduit end is then compressed radially inwardly such that the conduit end is compressed between the end fitting and the collar. When compressed, friction created between the collar and an outer surface of the conduit end, and friction created between an inner surface of the conduit end and the end fitting retains the conduit end within the collar.

The reliability of the conduit fitting assembly may vary over the life-cycle of the assembly based on the manufacturing tolerances of the conduit, collar, and end fitting. Dimensional departure from pre-established critical tolerances of the conduit, end fitting, collar, and the conduit fitting assembly may independently, or in aggregate, affect the outcome of quality testing. Accordingly, at least some known specification regulating bodies use qualification, sampling and periodic testing to verify manufacturing processes remain stable during manufacture. However, qualification, sampling, and periodic testing are typically only initiated at the beginning and end of manufacturing lots, and are usually destructive.

At least some known methods for testing a conduit fitting assembly include measuring an outer diameter of a compressed collar and an inner diameter of an end fitting to determine whether the assembly is acceptable. The number of times the collar is compressed to generate an acceptable collar outer diameter and end fitting inner diameter is determined by an operator, and may include more than one compression. However, correlation between the critical elements of the compression process, the tolerance stackup of critical characteristics of the collar, end fitting, conduit, and conduit fitting assembly as a whole, nor any performance or reliability criteria has been proven. Rather, only a general pass/fail of post-production sampling or periodic testing identifies whether the compression process and the critical tolerances for the end fitting, collar, conduit, and conduit fitting assembly are acceptable.

BRIEF DESCRIPTION OF THE INVENTION

In one aspect, a method is provided for predictive analysis of the performance and reliability of an assembly. The method includes measuring at least one force associated with construction of the assembly, and comparing the measured force to a predetermined expected force range.

In another aspect, a system for predictive analysis of the performance and reliability of an assembly. The system includes a machine for constructing an assembly and a measuring device coupled to the machine. The measuring device is configured to measure at least one force associated with construction of the assembly. The system also includes a data collection device coupled to the measuring device. The data collection device is configured to compare the measured force to a predetermined expected force range.

In yet another aspect, a method is provided for predictive analysis of the performance and reliability of a conduit fitting assembly. The conduit fitting assembly includes a collar, an end fitting, and a conduit compressed between the collar and the end fitting. The method includes measuring at least one force associated with compression of the conduit fitting assembly, and comparing the at least one measured force to a predetermined expected force range.

DETAILED DESCRIPTION OF THE INVENTION

As used herein, the term "conduit" may include any apparatus through which a fluid may be conveyed. For example, a conduit may include a tube, a pipe, a duct, a flexible hose, and/or a non-flexible hose. The above examples are intended as exemplary only, and thus are not intended to limit in any way the definition and/or meaning of the term "conduit". In addition, although the methods and systems described herein are described in association with a conduit fitting assembly, it should be understood that the methods and systems described herein may be applicable to any multi-component assemblies. Accordingly, practice of the present invention is not limited to method s and apparatus for coupling conduits.

Figure 1:
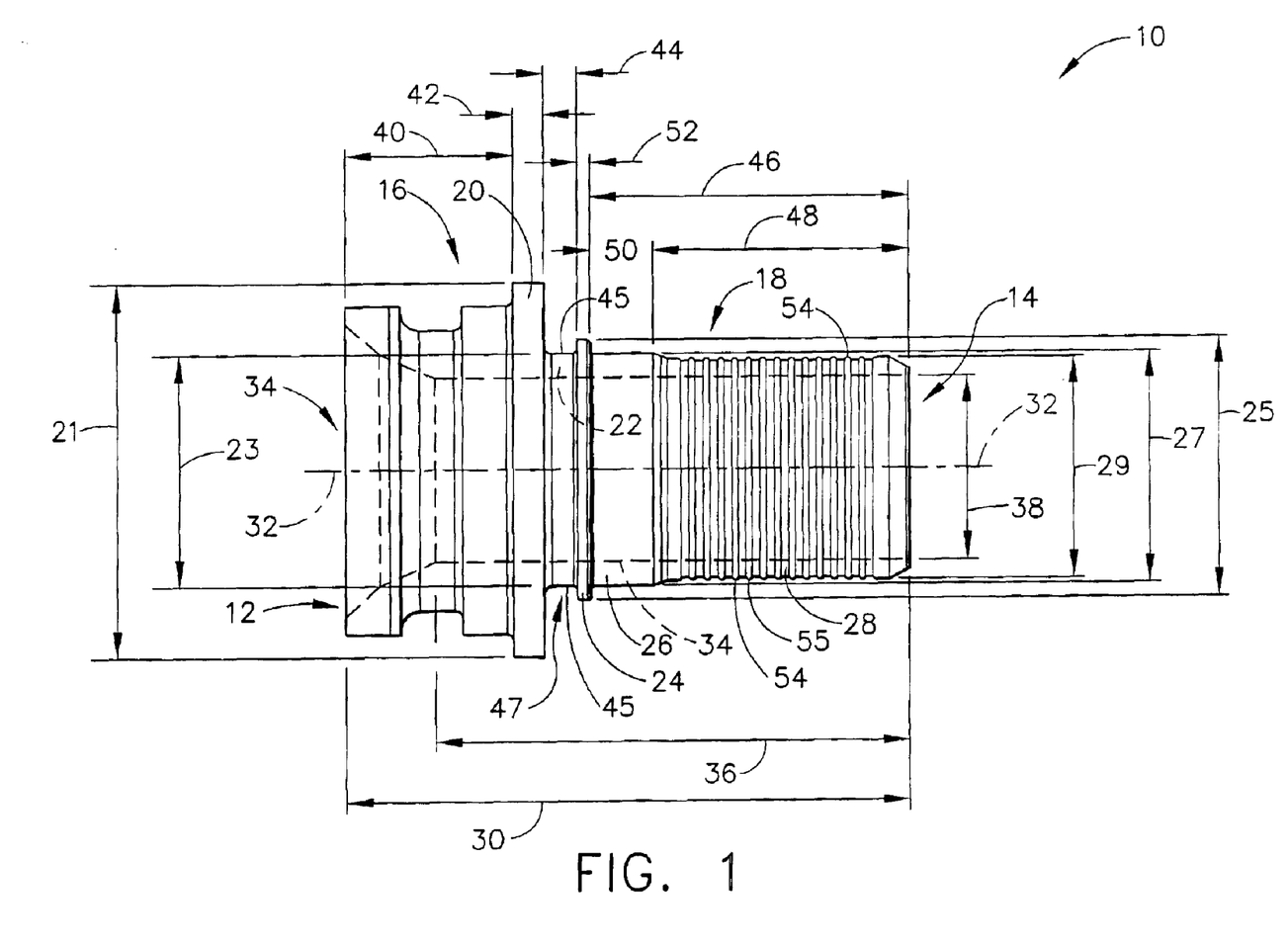
FIG. 1 is a side view of an exemplary end fitting for use with a conduit fitting assembly.

FIG. 1 is a side view of an exemplary end fitting 10 for use with a conduit fitting assembly (not shown in FIG. 1). End fitting 10 includes a first end 12, a second end 14, a fitting portion 16, and a nipple portion 18. End fitting 10 also includes a first annular portion 20 having a first diameter 21, a second annular portion 22 having second diameter 23, a third annular portion 24 having a third diameter 25, a fourth annular portion 26 having a fourth diameter 27, and a fifth annular portion 28 having a fifth diameter 29. In one embodiment, fourth diameter 27 is substantially equal to second diameter 23.

End fitting 10 has an overall length 30 measured between first end 12 and second end 14. A central axis 32 extends through end fitting 10 from first end 12 to second end 14. A substantially cylindrical passageway 34 extends for a length 36 through end fitting 10 from second end 14 to fitting portion 16. In the exemplary embodiment, passageway 34 has a substantially constant diameter 38 that is smaller than first diameter 21, second diameter 23, third diameter 25, fourth diameter 27, and fifth diameter 29. Fitting portion 16 is a distance 40 from end fitting first end 12, and is configured to couple with a second end fitting (not shown) such that passageway 34 is in coupled fluid communication with a passageway (not shown) extending through the second fitting.

End fitting first annular portion 20 has a width 42 extending between end fitting second annular portion 22 and fitting portion 16. End fitting second annular portion 22 has a width 44 extending between first annular portion 20 and end fitting third annular portion 24. A groove 47, hereinafter referred to as flange groove 47, is defined between end fitting second annular portion 22 and third annular portion 24. In addition, end fitting second annular portion 22 includes a radially outer surface 45. Nipple portion 18 is adjacent end fitting second end 14 and extends a distance 46 from end fitting second end 14 to end fitting third annular portion 24. Accordingly, nipple portion 18 includes fourth annular portion 26 and fifth annular portion 28. Fifth annular portion 28 extends a distance 48 from end fitting second end 14 to fourth annular portion 26, and fourth annular portion 26 extends a width 50 between fifth annular portion 28 and third annular portion 24. End fitting third annular portion 24 has a width 52 extending between end fitting second annular portion 22 and fourth annular portion 26. Nipple fifth annular portion 28 includes a plurality of projections 54 that extend outwardly therefrom and define nipple fifth diameter 29. As will be discussed in greater detail below, projections 54 facilitate retaining end fitting nipple portion 18 within a conduit end (not shown in FIG. 1).

Figure 2:
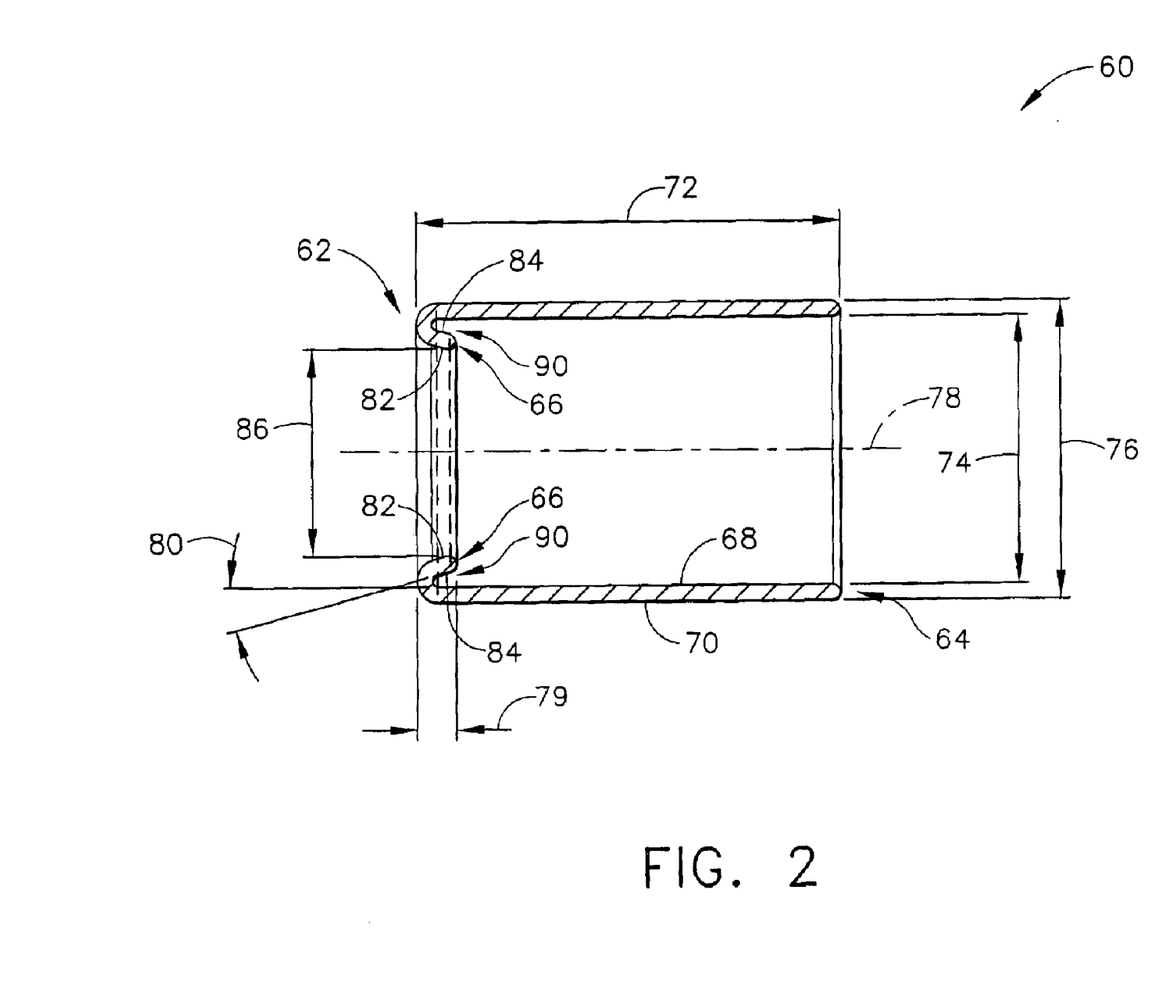
FIG. 2 is a cross-sectional view of an exemplary collar for use with a conduit fitting assembly.

FIG. 2 is a cross-sectional view of an exemplary collar 60 for use with a conduit fitting assembly (not shown in FIG. 2). Collar 60 includes a first end 62, a second end 64, a flange 66, a radially inner surface 68, and a radially outer surface 70. Collar 60 extends a length 72 between collar ends 62 and 64. In the exemplary embodiment, collar 60 is substantially cylindrical. An inner diameter 74 of collar 60 is defined by collar radially inner surface 68, and an outer diameter 76 of collar 60 is defined by collar radially outer surface 70. Collar 60 also includes a central axis 78 that extends through collar length 72. Flange 66 extends generally radially inwardly from collar first end 62 towards collar second end 64 for a length 79. In the exemplary embodiment, flange length 79 is smaller than end fitting second annular portion width 44, such that flange 79 is sized to be received within flange groove 47. Accordingly, flange 66 extends outwardly from collar first end 62 at an angle 80 relative to collar radially inner surface 68 such that flange 66 is obliquely aligned with respect to collar radially inner surface 68. In one embodiment, angle 80 is approximately equal to 9.5° relative to radially inner surface 68. In another embodiment, angle 80 may be between approximately 8° and 11 ° relative to radially inner surface 68.

Flange 66 includes a radially inner surface 82 and a radially outer surface 84. Flange radially inner surface 82 defines an inner diameter 86 of flange 66 that is larger than end fitting second diameter 23. In addition, flange 66 includes a flange gap 90 that is defined by flange radially outer surface 84 and collar radially inner surface 68, and more specifically, by flange angle 80.

Figure 3:
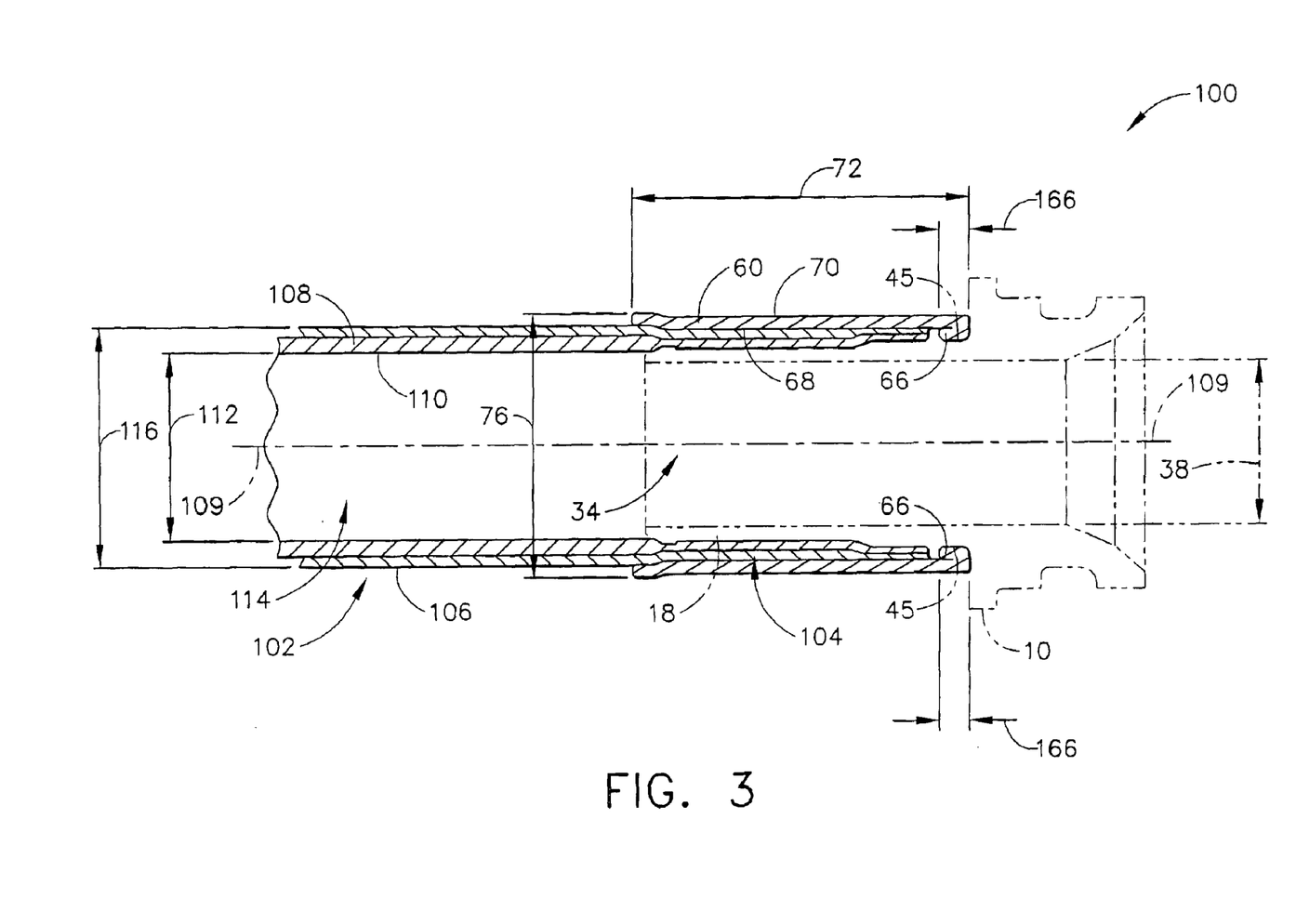
FIG. 3 is a cross-sectional view of a conduit fitting assembly including the end fitting shown in FIG. 1, and the collar shown in FIG. 2.
Figure 4:
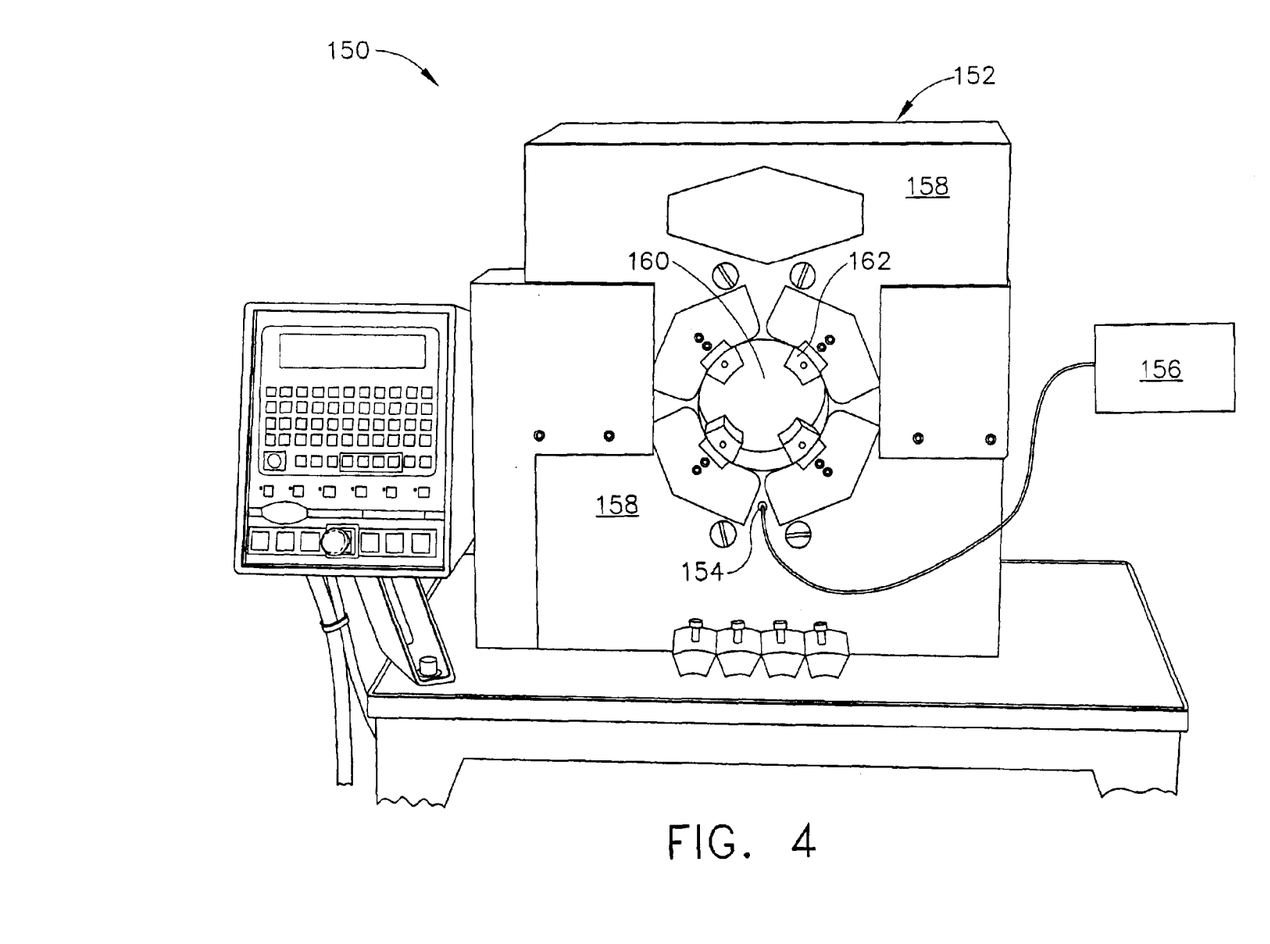
FIG. 4 is a perspective view of an exemplary compression press system.
Figure 5:
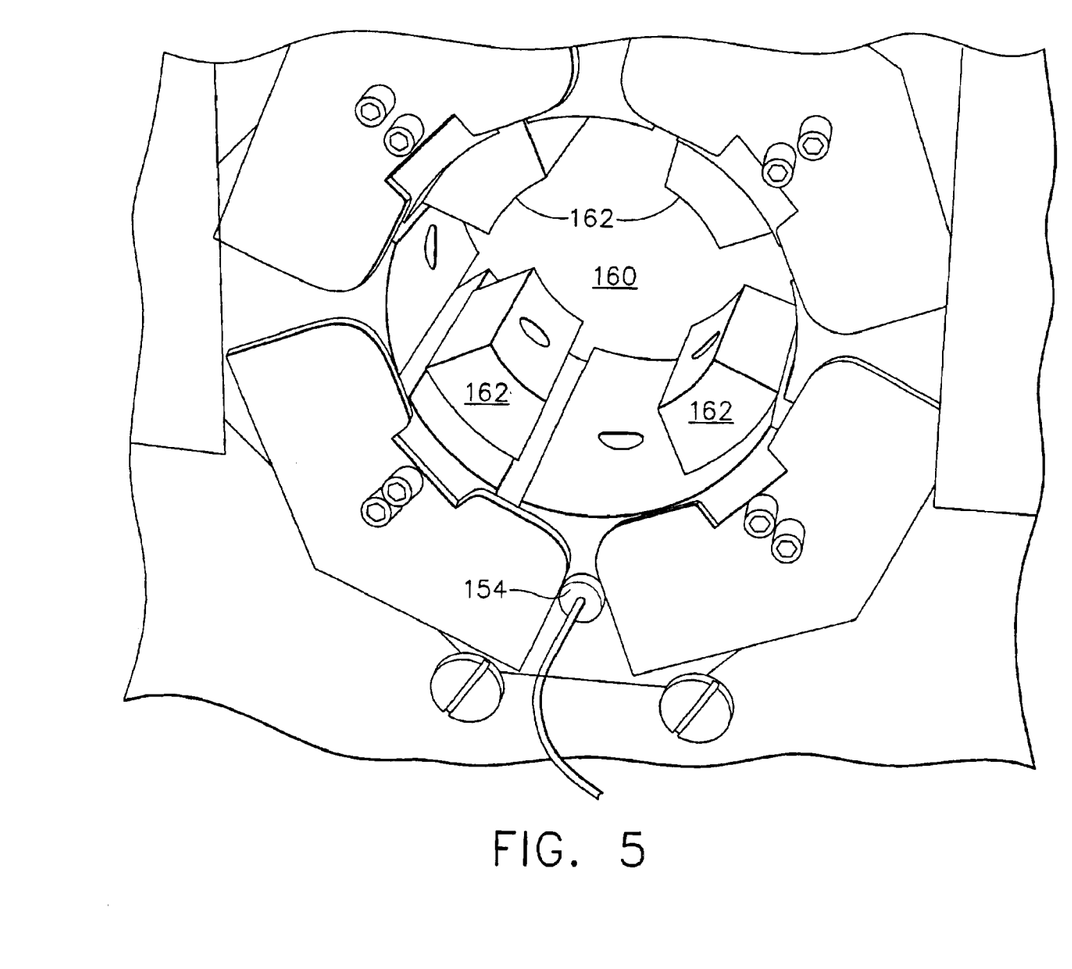
FIG. 5 is a perspective view of a portion of the compression press system shown in FIG. 4.

FIG. 3 is a cross-sectional view of a conduit fitting assembly 100 including end fitting 10, collar 60, and a conduit 102. FIG. 4 is a perspective view of an exemplary compression press system 150 used for assembling conduit fitting assembly 100. FIG. 5 is a perspective view of a portion of compression press system 150. Conduit 102 includes a first end 104, a second end (not shown), a radially outer surface 106, and a liner 108. A central axis 109 extends through conduit 102 between conduit first end 104 and the conduit second end. A radially inner surface 110 of conduit liner 108 defines an inner diameter 112 of conduit 102. Conduit liner inner surface 110 also defines a passageway 114 that extends substantially through the length of conduit 102 between conduit first end 104 and the conduit second end. Conduit radially outer surface 106 defines an outer diameter 116 of conduit 102. Conduit 102 is received within a portion of collar 60, and end fitting nipple portion 18 is received within a portion of conduit 102, such that conduit passageway 114 is coupled in fluid communication with end fitting passageway 34. In the exemplary embodiment, conduit inner diameter 112 is smaller than nipple fourth diameter 27 and nipple fifth diameter 29. In addition, in the exemplary embodiment, conduit outer diameter 116 is smaller than collar inner diameter 74.

Compression press system 150 includes a compression press 152, a measuring device 154, and a data collection device 156. Compression press 152 includes a body 158, an opening 160 within body 158, and a plurality of compression jaws 162 coupled to compression press body 158 within opening 160. Compression jaws 162 are configured to apply compressive force radially inwardly when actuated by compression press 152. In one embodiment, compression press 152 is a UNIFLEX HM370® commercially available from UNIFLEX of America, Columbus, Ohio. In another embodiment, compression press 152 is a UNLFLEX HM240®. Measuring device 154 is coupled to body 158 and is configured to measure reaction forces regarding compression jaws 162 and compression press 152 during compression of collar 60. In an alternative embodiment, measuring device 154 is coupled to compression jaws 162. In one embodiment, measuring device 154 is a strain gage. Measuring device 154 is electrically connected to data collection device 156 and is configured to transmit a signal indicative of the reaction forces to data collection device 156. Data collection device 156 includes a display 164 and, as will be described in more detail below, converts the signal representing the reaction forces, such that the converted signal is displayed on display 164. In addition, device 156 records a force/time history. In one embodiment, data collection device 156 is a Kistler Control Monitor CoMo II-S® commercially available from Kistler Instrument Corporation, Amherst, N.Y. In an alternative embodiment, data collection device is a personal computer including data collection and Statistical Process Control (SPC) software used to determine process capability via various analyses of process indicators and measurements, such that a process or subprocess may be adjusted to reduce variations in output quality with respect to predefined limits. Known SPC applications exist that permit a convenient database population of collected process data and subsequent statistical analysis to indicate a level of process stability.

To assemble conduit fitting assembly 100, conduit first end 104 is inserted within a portion of collar 60 such that conduit 102 and collar 60 are substantially concentrically aligned, and such that conduit central axis 109 is substantially co-linearly aligned with collar central axis 78. End fitting nipple portion 18 is then inserted within conduit first end 104 such that flange 66 is at least partially received in flange groove 47, and such that end fitting 10 is generally concentrically aligned with conduit 102 and collar 60. More specifically, end fitting central axis 32 is substantially co-linearly aligned with collar central axis 78 and conduit central axis 109. Conduit fitting assembly 100 is then inserted within compression press body opening 160 such that collar 60 is received within opening 160. Using compression jaws 162, compressive force is applied around at least a portion of collar radially outer surface 70, such that conduit 102 is compressed radially inwardly between end fitting nipple portion 18 and collar 60. More specifically, a portion of conduit 102 is compressed radially inwardly between nipple fifth annular portion 28 and collar radially inner surface 68, and a portion of conduit 102 is compressed between collar radially inner surface 68 and nipple fourth annular portion 26.

Compression of collar 60 also forces flange 66 into flange groove 47, such that flange radially inner surface 82 contacts end fitting second diameter portion outer surface 45, and such that flange 66 is compressed. Compression of flange 66 causes flange gap 90 to substantially close such that flange radially outer surface 84 contacts collar radially inner surface 68. Accordingly, when compressed, flange 66 is substantially parallel to collar radially inner surface 68. In addition, when flange 66 is compressed flange 66 extends a length 166 from collar first end 62 towards collar second end 64. In the exemplary embodiment, flange length 166 is approximately equal to end fitting second annular portion width 44, such that flange 66 fits securely within flange groove 47 when compressed.

After collar 60 has been compressed, friction between collar radially inner surface 68 and conduit radially outer surface 106 facilitates retaining conduit first end 104 within collar 60, such that first end 104 is fixedly secured to collar 60. In one embodiment, conduit radially outer surface 106 includes a wirebraid (not shown) that facilitates retaining conduit first end 104 within collar 60 such that first end 104 is fixedly secured to collar 60. In addition, friction between projections 54 and conduit liner inner surface 110 facilitates retaining end fitting nipple portion 18 within conduit first end 104 such that end fitting nipple portion 18 is fixedly secured within conduit first end 104. Furthermore, when collar 60 has been compressed, flange 66 facilitates retaining a portion of end fitting 10 within collar 60 such that end fitting 10 is fixedly secured to collar 60.

After conduit fitting assembly has been assembled, conduit passageway 114 is coupled in fluid communication to end fitting passageway 34 and is substantially sealed with respect to end fitting passageway 34, such that fluid does not leak from conduit fitting assembly 100. More specifically, compression of conduit 102 between fourth annular portion 26 and collar radially inner surface 68, and compression between fifth annular portion 28 and collar radially inner surface 68, facilitates sealing conduit fitting assembly 100 to facilitate preventing fluid flow and/or leakage between conduit liner inner surface 110 and the radially outer surfaces of fitting nipple portion 18.

Figure 6:
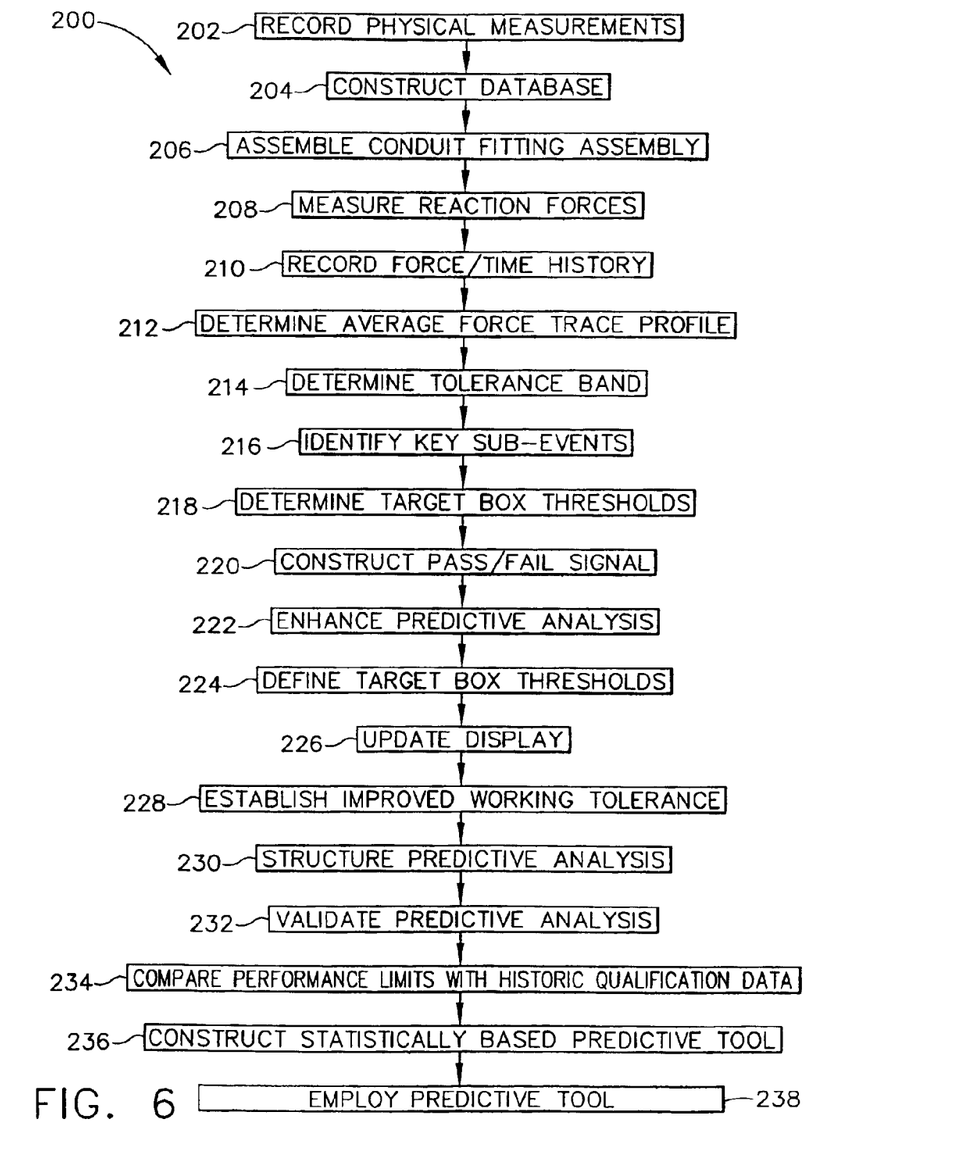
FIG. 6 is a flowchart illustrating an exemplary method for predictive analysis of the reliability of the conduit fitting assembly shown in FIG. 3.
Figure 7:
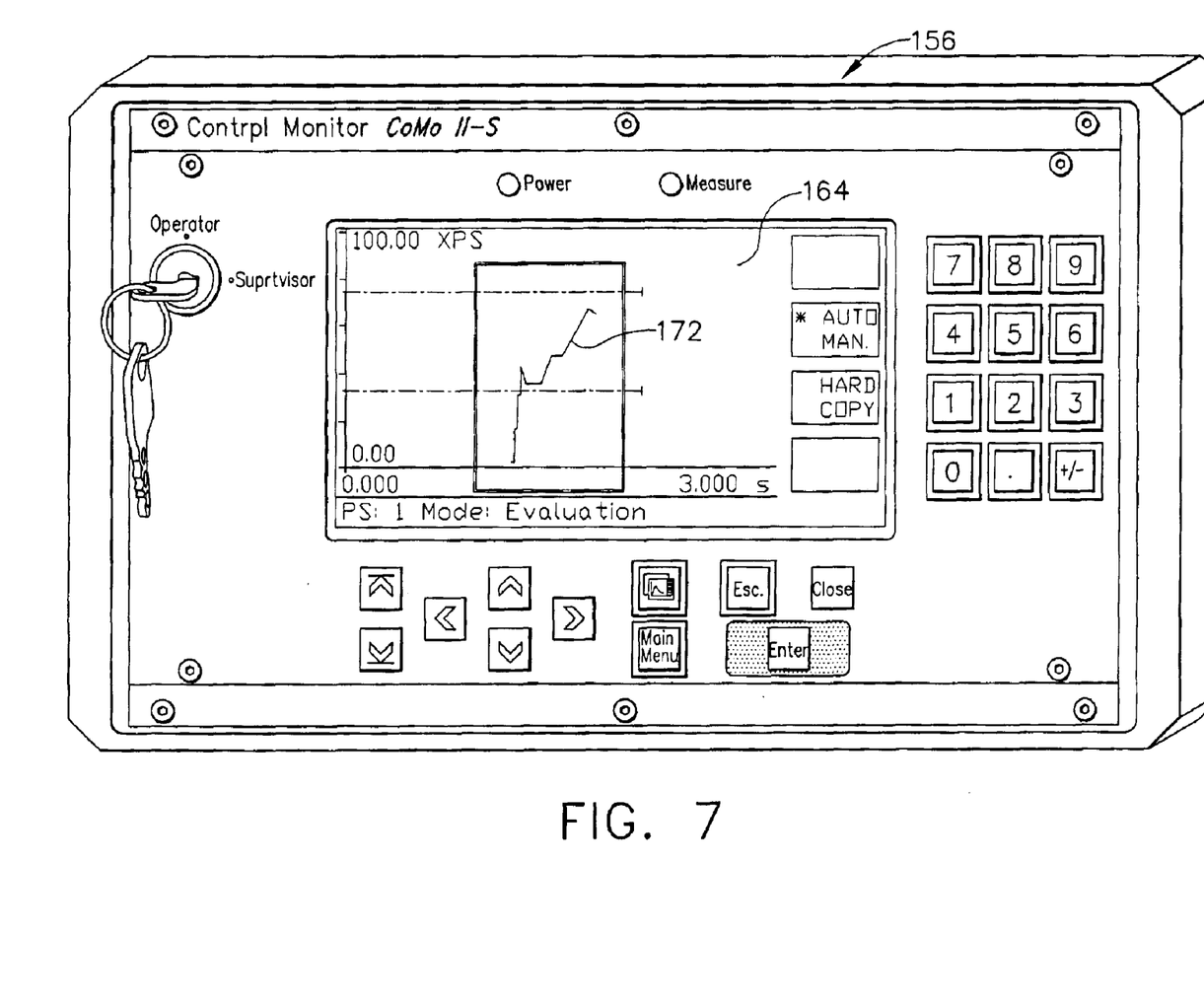
FIG. 7 is a perspective view of an exemplary data collection device for use with the compression press system illustrated in FIG. 4.
Figure 8:
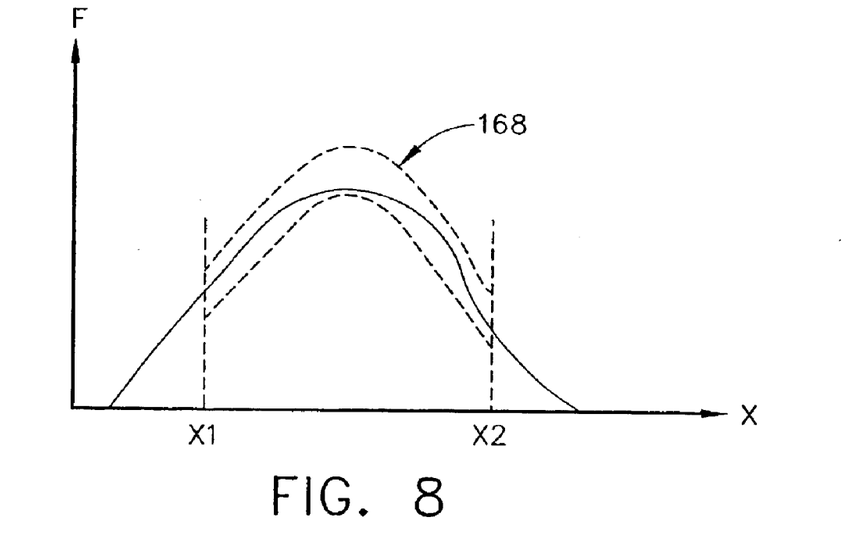
FIG. 8 is a graphical representation of an exemplary tolerance band for a plurality of conduit fitting assemblies, such as the conduit fitting assembly shown in FIG. 3.
Figure 9:
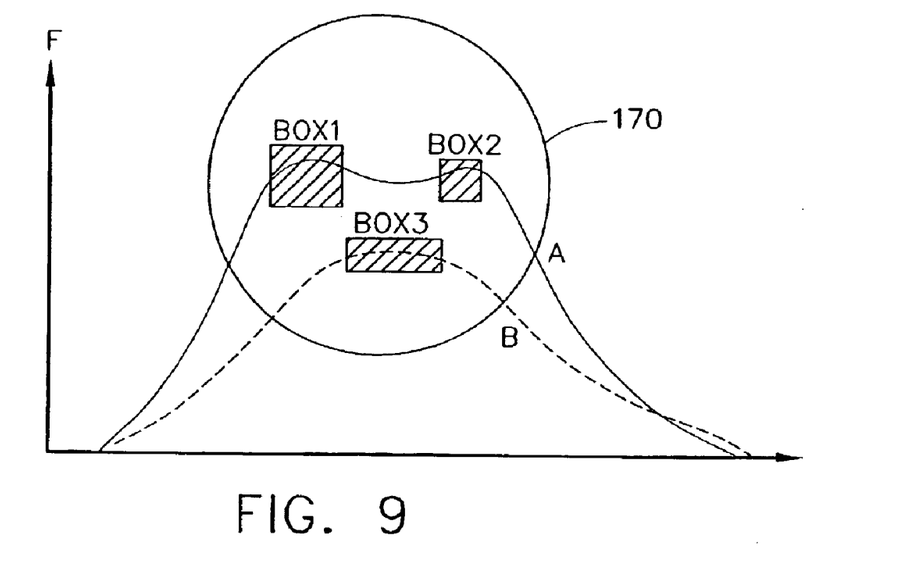
FIG. 9 is a graphical representation of exemplary target box thresholds for a plurality of conduit fitting assemblies, such as the conduit fitting assembly shown in FIG. 3.

FIG. 6 is a flowchart illustrating an exemplary method for predictive analysis 200 of the performance and reliability of conduit fitting assembly 100. FIG. 7 is a perspective view of an exemplary data collection device 156. FIG. 8 is a graphical representation of an exemplary tolerance band 168 for use with a plurality of conduit fitting assemblies, such as conduit fitting assembly 100 (shown in FIG. 3). FIG. 9 is a graphical representation of exemplary target box thresholds 170 for use with a plurality of conduit fitting assemblies, such as conduit fitting assembly 100 (shown in FIG. 3). The method 200 includes recording 202 physical measurements for characteristics of end fitting 10, collar 60, and conduit 102 prior to assembling of conduit fitting assembly 100. A database containing the recorded physical measurements is then constructed 204, and conduit fitting assembly 100 is then assembled 206 as described above.

During compression of collar 60 by compression press 152, measuring device 154 measures 208 reaction forces within compression jaws 162 and compression press 152 and records 210 a force/time history for conduit fitting assembly 100. Alternatively, the reaction forces are measured in the press body. Steps 206, 208, and 210 are then repeated as necessary for other conduit fitting assemblies such that reaction forces are measured 208 and a force/time history is recorded 210 for the compression assembly cycle for a conduit fitting assembly. The force/time history for a particular conduit fitting assembly includes a measurement of the reaction force or forces applied during all, or a portion of, the time period during which compression jaws 162 compress collar 60.

Using the force/time histories for each of the plurality of conduit fitting assemblies, data collection device 156 determines 212 an average force trace profile 172 for the conduit fitting assembly. Alternatively, an average force trace profile may be determined using a data set that is variably adjustable. A tolerance band 168 for the reaction force or forces is also determined 214 using average force trace profile 172 and statistical methods.

In one embodiment, method 200 also includes identifying key sub-events 216 within compression of collar 60. For example, the key sub-events may include yield of collar 60, compression of conduit liner 108, compression of conduit radially outer surface 106, and yield of end fitting 10. More specifically, identifying key sub-events 216 includes measuring a force associated with a sub-event or a plurality of sub-events using measuring device 154. Target box force thresholds 170 are then determined 218 for each sub-event using data collection device 156. Subevents in the crimping operation, as applies to the figures for the PTFE with wirebraid overlay, are serial and may include, but are not limited to, initial yield of the collar, increased force as the collar begins compression of the wirebraid/PTFE tube against the nipple, aggregate yield of the collar and PTFE in compression against the nipple, yield of the nipple in aggregate, and/or force delta over any compression stroke dwell at the end of travel. Target Box Thresholds, with respect to force and time, can be set for the entire event or for key subevents, such that indicators determined to be critical to the assembled part quality may be examined in more detail than available for just the main compression event. More specifically, The Kistler unit has the capability to set profile tolerance bands for force as well as time in these boxes, which is expected to provide an indication of an effective subevent function for example, in the case of a collar wall that is at a less than desirable thickness, a PTFE and wire that are at a less than desirable thickness, and/or a nipple diameter that is at a less than desirable width. The expectation is that we would have a serial trace of the whole event (with tolerance of force profile and time) containing subevents (each with force profile and time). This indication would be compared to known/expected reactions and determined to PASS or FAIL. The objective is to preclude acceptance of an assembly, wherein the combination of characteristics provided by individual components was all within individual tolerance, that met the requirement of the overall force/time profile but for some reason did not fall within the expected profile for a key subevent. In one embodiment, target box force thresholds 170 are determined using upper specification limits (USL) and lower specification limits (LSL) within a period of time, and are used with respect to determining tolerances for characteristics of magnitude, such as, but not limited to diameter plus (USL) or minus (LSL), time hours minimum (LSL) to maximum (USL), and/or force pounds min (LSL) to pounds max (USL). In one embodiment, a pass/fail signal 174 is constructed 220 to help an operator and/or engineer determine reaction force history consistency using at least one of the plurality of force time histories, average force trace profile 172, tolerance band 168, and target box force thresholds 170.

Utilizing the plurality of force time histories, average force trace profile 172, tolerance band 168, and target box force thresholds 170, enhances 222 predictive analysis 200 of the performance and reliability conduit fitting assembly 100, and facilitates reducing a number of critical factors necessary for analytical input. Target box force/time thresholds 170 are refined 224 and data collection device display 164 is updated 226. More specifically, display 164 is updated 226 to read as a manufacturing operation sheet, including operator instruction on data input, force/time output, and a resulting pass/fail signal 176. Pass/fail signal 176 indicates 'Pass' when the reaction force or forces generated during compression of a conduit fitting assembly are within tolerance band 168. Pass/fail signal 176 indicates a 'Fail' when some factor in a compressed conduit fitting assembly caused the reaction force or forces to fall outside tolerance band 168. When pass/fail signal 176 indicates 'Fail', the compressed conduit fitting assembly will be subject to additional evaluation. Pass/fail signal 176 is used only to warn an operator and/or engineer that a compressed conduit fitting assembly does not meet tolerance band 168.

Utilizing predictive analysis 200, refined target box force/time thresholds 170, and updated data collection device display 164, improved working tolerances for the characteristics of collar 60, end fitting 10, conduit 102, and conduit fitting assembly 100, are established 228. More specifically, in addition to improved tolerances for collar 60, end fitting 10, and conduit 102, an improved tolerance band 168 may also be established 228. Predictive analyses are structured 230 that identify select, or critical, collar 60, end fitting 10, and conduit 102 characteristic combinations that affect the performance and reliability of conduit fitting assembly 100. The predictive analyses are validated 232 by qualification testing and the performance limits of improved conduit fitting assemblies are compared 234 with historic qualification data. A statistically-based predictive tool is then constructed 236 that assess the potential performance of a conduit fitting assembly with known critical characteristics. The predictive tool is then employed 238 in the production of conduit fitting assemblies to create an accept/reject indication of a compressed conduit fitting assembly by comparing the force time history for that particular conduit fitting assembly with improved tolerance band 168.

The above-described method is cost-effective and highly reliable for predictive analysis of the performance and reliability of a conduit fitting assembly. The method facilitates reducing false rejections of acceptable conduit fitting assemblies, and facilitates reducing false acceptances of unacceptable conduit fitting assemblies. The method also facilitates real-time indication of expected assembly performance. More specifically, the method facilitates real-time indication of expected assembly performance by comparing forces generated during compression of the assembly to expected forces. In addition, the method facilitates predictive analysis of new product/process development, failure analysis and corrective action efforts, and support of Material Review Board disposition of nonconforming material. Defective material (in this case an assembly) that is out of tolerance (known to be noncompliant to specification requirements, resulting from known processes that cause failed sampling and/or periodic qualification testing) is submitted for technical review and dispositioned to rework, repair, scrap, or use-as-is. Furthermore, the method facilitates the use of the methods and systems described herein with other operations involving mechanical modification of components in an assembly.

Exemplary embodiments of methods and systems for predictive analysis of the performance and reliability of a conduit fitting assembly are described above in detail. The methods and systems are not limited to the specific embodiments described herein, but rather, components of each method and system may be utilized independently and separately from other components described herein. In addition, each method and system component can also be used in combination with other method and system components.

While the invention has been described in terms of various specific embodiments, those skilled in the art will recognize that the invention can be practiced with modification within the spirit and scope of the claims.

What is claimed is:

1. A method for predictive analysis of the performance and reliability of an assembly, said method comprising:
    measuring at least one force associated with construction of the assembly; and
    comparing the measured force to a predetermined expected force range, wherein the predetermined expected force range is determined by measuring at least one force associated with the construction of a plurality of similar assemblies, and determining an average force profile for the plurality of assemblies based on the plurality of measurements taken.

2. A method in accordance with claim 1 wherein measuring at least one force comprises:
    measuring at least one force associated with construction of the assembly over a period of time; and
    recording the at least one measured force for the period of time.

3. A method in accordance with claim 1 further comprising determining the expected force range using the average force profile.

4. A method in accordance with claim 1 wherein comparing the measured force to a predetermined expected force range comprises displaying a pass signal on a display when the measured force is within the expected force range.

5. A method in accordance with claim 1 wherein comparing the measured force to a predetermined expected force range comprises displaying a fail signal on a display when the measured force is outside the expected force range.

6. A method in accordance with claim 1 further comprising qualification testing the assembly if the measured force is within the expected force range.

7. A method in accordance with claim 6 further comprising comparing results of the qualification testing with historic qualification data.

8. A method in accordance with claim 1 further comprising:
    identifying at least one sub-event during construction of the assembly; and
    determining at least one target box force/time threshold for the sub-event.

9. A method in accordance with claim 8 wherein the assembly is a conduit fitting assembly including a collar, an end fitting, and a conduit, said identifying at least one sub-event comprising identifying at least one of yield of the collar, yield of the end fitting, and compression of the conduit.

10. A method in accordance with claim 8 wherein determining at least one target box force threshold comprises determining at least one target box force threshold using upper specification limits (USL) and lower specification limits (LSL).

11. A method in accordance with claim 8 further comprising using the at least one target box force threshold to determine the expected force range.

12. A system for predictive analysis of the performance and reliability of an assembly, said system comprising:
   a machine for constructing an assembly;
   a measuring device coupled to said machine, said measuring device configured to measure at least one force associated with construction of the assembly; and
   a data collection device coupled to said measuring device, said data collection device configured to compare the measured force to a predetermined expected force range wherein the expected force range is determined using an average force profile for a plurality of similar assemblies based on a plurality of measurements taken for the plurality of assemblies by said measuring device.

13. A system in accordance with claim 12 wherein said measuring device configured to measure at least one force associated with construction of the assembly over a period of time, said data collection device configured to record the at least one measured force for the period of time.

14. A system in accordance with claim 12 wherein said data collection device comprises a display and is configured to:
   display a pass signal on the display when the measured force is within the expected force range; and
   display a fail signal on the display when the measured force is outside the expected force range.

15. A system in accordance with claim 12 wherein said measuring device configured to measure at least one force associated with at least one sub-event of the construction of the assembly, said data collection device configured to determine at least one target box force threshold for the at least one sub-event.

16. A method for predictive analysis of the performance and reliability of a conduit fitting assembly including a collar, an end fitting, and a conduit compressed between the collar and the end fitting, said method comprising:
   measuring at least one force associated with compression of the conduit fitting assembly;
   measuring at least one force associated with the construction of a plurality of similar conduit fitting assemblies;
   determining an average force profile for the plurality of assemblies based on the plurality of measurements taken;
   determining the expected force range using the average force profile; and
   comparing the at least one measured force to a predetermined expected force range.

17. A method in accordance with claim 16 further comprising:
   qualification testing the conduit fitting assembly if the at least one measured force is within the expected force range; and
   comparing the results of the qualification testing with historic qualification data.

* * * * *